E. HATTON.
TOOTHED GEARING.
APPLICATION FILED JULY 12, 1915.

1,213,190.

Patented Jan. 23, 1917.

UNITED STATES PATENT OFFICE.

ERNEST HATTON, OF KILLINGWORTH, ENGLAND.

TOOTHED GEARING.

1,213,190.     Specification of Letters Patent.     Patented Jan. 23, 1917.

Application filed July 12, 1915. Serial No. 39,471.

*To all whom it may concern:*

Be it known that I, ERNEST HATTON, a subject of the King of Great Britain and Ireland, residing at Sunnyside, Killingworth, in the county of Northumberland, England, have invented new and useful Improvements in or Applicable to Toothed Gearing, of which the following is a specification.

This invention relates to improvements in or applicable to toothed gears for the transmission of power, and has for its objects to secure greater accuracy in the coincidence of the pitch lines, to diminish vibration and noise in working, and to prolong the effective life of such gears.

Figure 1:
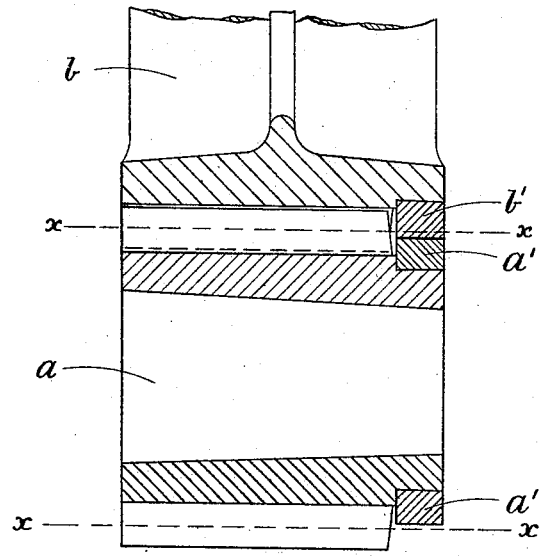
Figure 3:
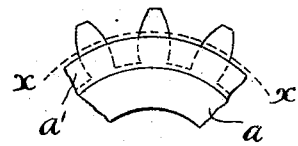
Figure 2:
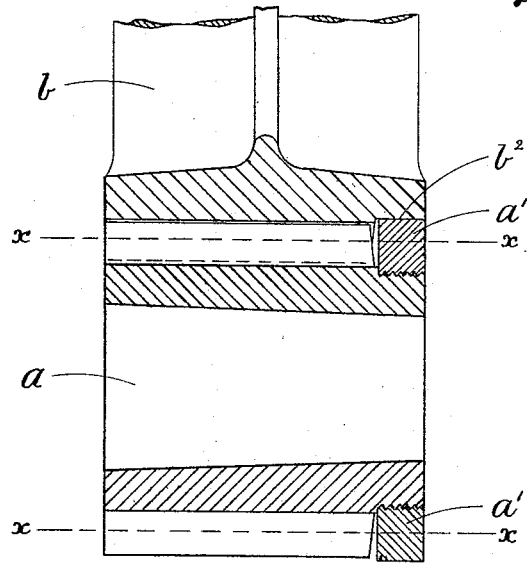

In the accompanying drawings, Figure 1 is a vertical section illustrating a spur pinion and segment of a spur wheel having my invention applied thereto; Fig. 2 being a similar view illustrating an alternative design embodying the same principle of construction. Fig. 3 is a face view of a portion of one of the wheels, showing the rim of the collar or flange non-coincident with the pitch circle.

One of the principal causes of wear and noisy running in gears of the character referred to is the reaction which follows the partial separation of the wheels in mesh under the stress incidental to a sudden application of power or due to wear of the bearings. The effect of such reaction is to bring the apices of the teeth of one wheel into forcible contact with the bottoms of the grooves between the teeth of the other wheel. My invention is designed to obviate this destructive and otherwise objectionable effect.

Assuming my invention to be applied, by way of illustration, to a spur gear comprising a spur pinion $a$ and a spur wheel $b$—the pitch circle being represented by the dotted line $x$—$x$—I provide the pinion $a$ with a collar $a'$ having a diameter somewhat less than that of the pitch circle of the pinion $a$; and I provide the wheel $b$ with a similar collar $b'$ having a diameter somewhat greater than that of the pitch circle of the wheel. Under these conditions, the periphery of the collar $a'$ normally runs on, and remains in contact with the periphery of the collar $b'$ on the wheel, and prevents the pitch circle of the one wheel ever falling within that of the other wheel, thereby preventing the teeth of the one wheel "bottoming" between those of the other. As, moreover, the peripheral speed of the collar $a'$ upon the pinion is slightly lower than that of the collar $b'$ of the wheel with which it contacts, a slight sliding or rubbing, as distinguished from a pure rolling, effect between these two surfaces takes place, with the effect that they are maintained true and the formation of flats, which would otherwise result, is prevented.

Although I have described the collar $a'$ pertaining to the pinion as somewhat smaller in diameter than that of the pitch circle of the pinion, and the diameter of the collar $b'$ pertaining to the wheel as somewhat larger than that of the pitch circle pertaining to the wheel, it will be obvious that, these conditions may be reversed as in the modified construction illustrated in Fig. 2. According to this design, only one of the elements, namely the pinion $a$ is provided with a collar $a'$, the opposed bearing surface $b^2$ formed upon the wheel $b$ being situate within the pitch circle of the wheel $b$.

It will be obvious that the collar or collars may be formed or applied in various ways. In Fig. 1 they are shown shrunk on. In Fig. 2 the collar is screwed on; but it may be formed and secured in other ways, or may be made integral with the pinion or with the wheel without affecting the principle of the invention.

With gearing provided with means of the character above described, whereby the pitch circles of the respective wheels are prevented from cutting one another, I have found that the wear is so greatly reduced that comparatively soft steel may be employed with a corresponding reduction in cost, concurrently with comparative silence in working.

I claim:—

1. Toothed gearing wherein the pinion and the wheel are respectively formed or provided with cylindrical contact surfaces non-coincident with the pitch circle, substantially as and for the purpose set forth.

2. Toothed gearing wherein the pinion or the wheel is formed or provided with a radially extending collar, and the wheel or pinion with a surface on which the said collar rolls and slides, such contact surface being non-coincident with the pitch-circle, substantially as and for the purpose set forth.

ERNEST HATTON.

Witnesses:
J. HAROLD GLOVER,
J. WHILLIS.

Copies of this patent may be obtained for five cents each, by addressing the "Commissioner of Patents, Washington, D. C."